United States Patent
Cook

[11] Patent Number: 6,065,909
[45] Date of Patent: May 23, 2000

[54] DRILL BIT ASSEMBLY WITH AN ADJUSTABLE HOLE SAW

[76] Inventor: John E. Cook, 1021 Sunnyside, Wauconda, Ill. 60084

[21] Appl. No.: 09/274,697

[22] Filed: Mar. 23, 1999

Related U.S. Application Data

[60] Provisional application No. 60/106,303, Oct. 30, 1998.

[51] Int. Cl.[7] ................................................ B23B 51/04
[52] U.S. Cl. .......................... 408/206; 408/110; 408/209
[58] Field of Search .................................. 408/79, 80, 81, 408/204, 206, 208, 209, 231, 233, 239 R, 110, 115 R

[56] References Cited

U.S. PATENT DOCUMENTS

| | | | |
|---|---|---|---|
| 1,449,790 | 3/1923 | Sprague | 408/206 |
| 1,596,197 | 8/1926 | Lindgren | 408/206 |
| 3,976,387 | 8/1976 | Segal . | |
| 4,077,737 | 3/1978 | Morse | 408/206 |
| 4,148,593 | 4/1979 | Clark | 408/206 |
| 4,760,643 | 8/1988 | Juma . | |
| 5,061,126 | 10/1991 | Cain . | |
| 5,108,235 | 4/1992 | Czyzewski . | |
| 5,167,475 | 12/1992 | Miyanaga . | |
| 5,597,274 | 1/1997 | Behnel . | |
| 5,743,682 | 4/1998 | Segal . | |
| 5,829,929 | 11/1998 | Lewis . | |

FOREIGN PATENT DOCUMENTS

| | | | |
|---|---|---|---|
| 2410120 | 9/1975 | Germany | 408/206 |
| 238675 | 8/1925 | United Kingdom | 408/206 |
| 583962 | 1/1947 | United Kingdom | 408/209 |

*Primary Examiner*—Daniel W. Howell
*Attorney, Agent, or Firm*—Meroni & Meroni; Charles F. Meroni, Jr.

[57] ABSTRACT

A multi-function drill bit assembly with slideably positionable hole saw comprising an elongate bit member, a reversible arbor member, and a hole saw member. The elongate drill bit member has a drilling portion and an attachment portion, with the drilling portion having a sharp cutting tip and the attachment portion having at least one flat surface running longitudinally across. The reversible arbor member has a cylindrical cavity extending axially therethrough with the attachment portion of the drill bit member being slideably disposed in the cylindrical cavity. The arbor member has a first portion and a cylindrical skirt portion, the cylindrical skirt portion extending outwardly from the first portion and being generally concentric with the cylindrical cavity. The cylindrical skirt portion has an exterior surface with a first set of threads running circumferentially across. The hole saw member has a cylindrical body with a closed end and an open end. A plurality of cutting teeth peripherally extend from the open end. The closed end has an aperture therethrough with a second set of threads extending circumferentially around the aperture, the second set of threads being axially aligned to correspond with the first set of threads. The cylindrical skirt portion of the arbor member is disposed in the aperture in the hole saw member, and the elongate drill bit member is disposed in and extends through the hole saw member.

26 Claims, 3 Drawing Sheets

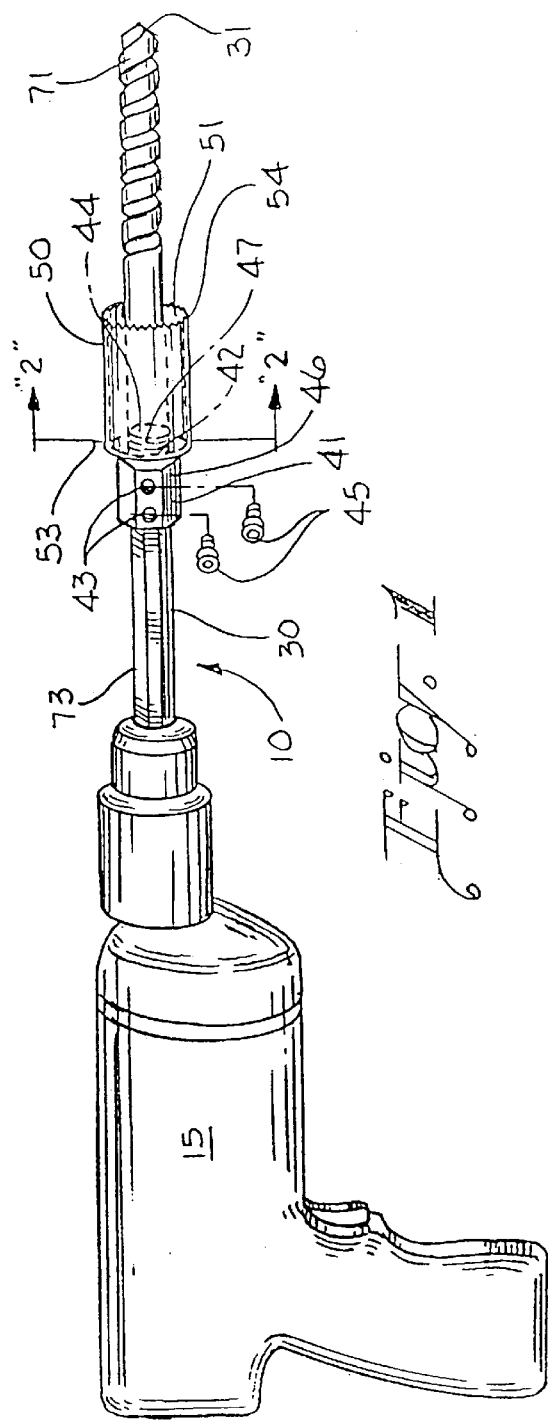
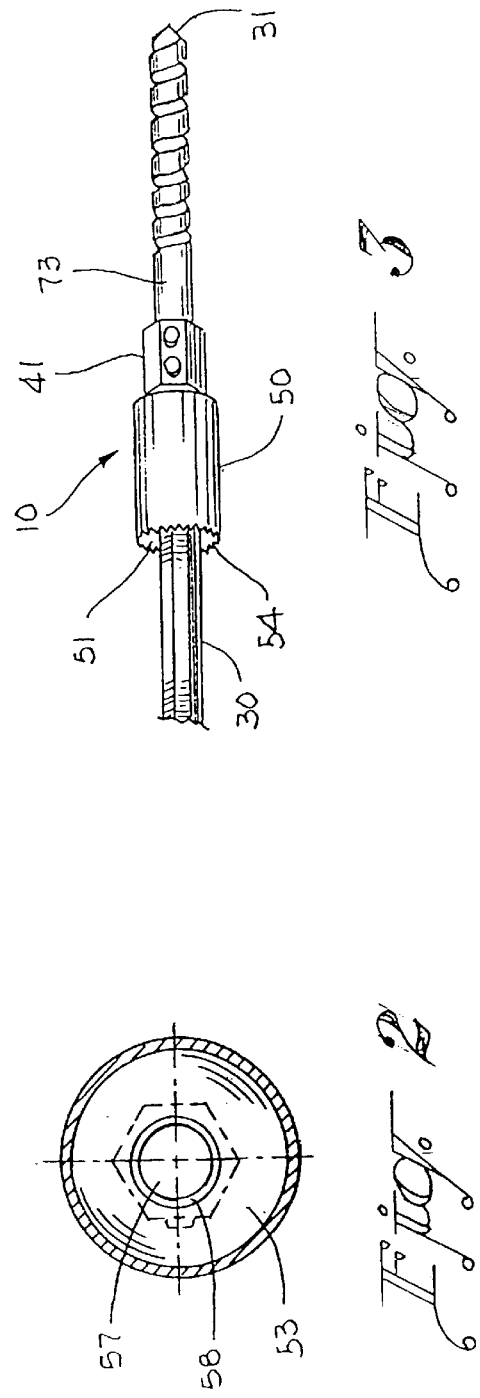

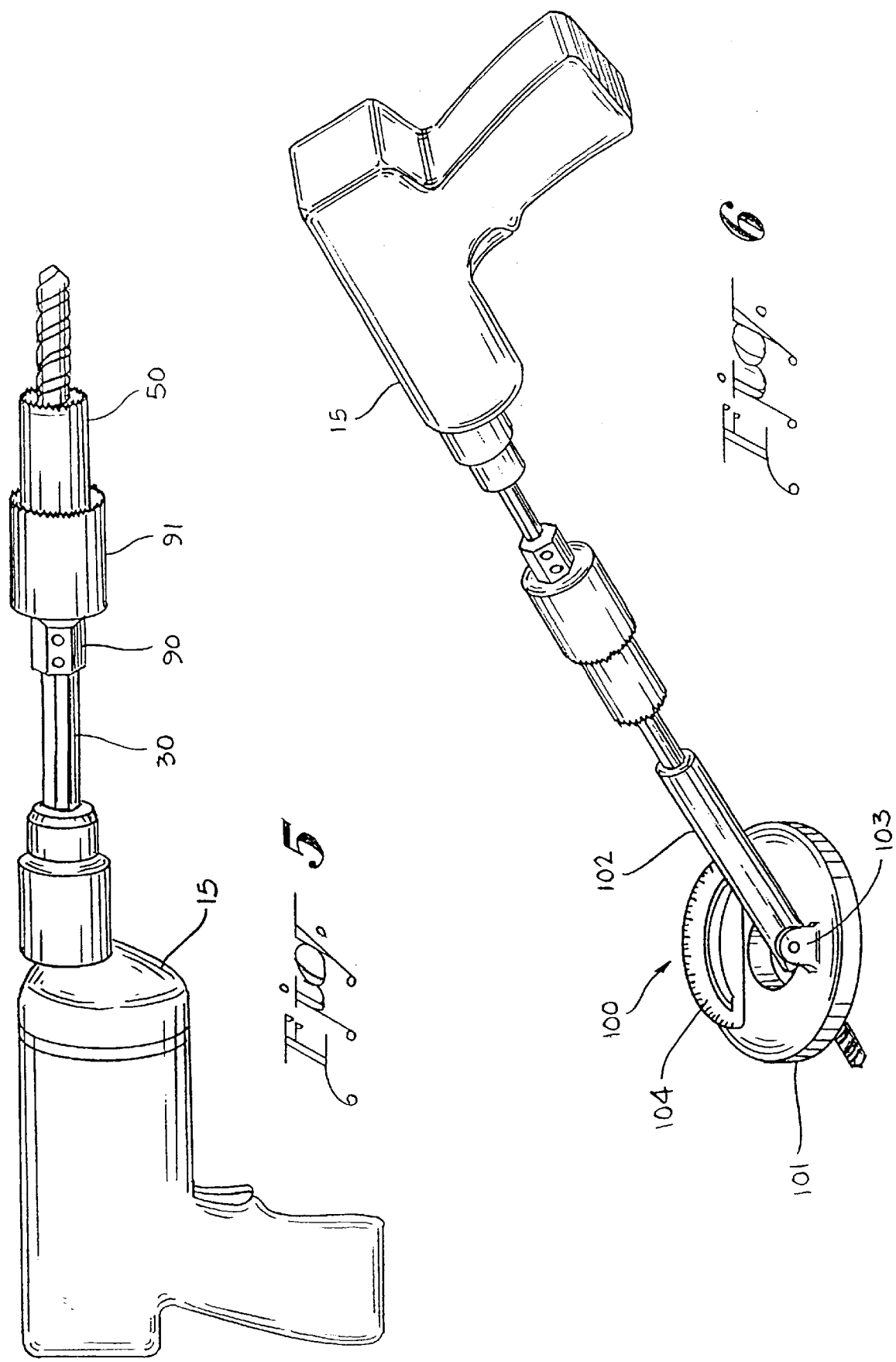

DRILL BIT ASSEMBLY WITH AN ADJUSTABLE HOLE SAW

PRIOR HISTORY

This application claims the benefit of U.S. Provisional Application Ser. No. 60/106,303 filed on Oct. 30, 1998.

BACKGROUND OF THE INVENTION

1. Field of the Invention

The present invention relates to a drill bit assembly with an adjustable hole saw for performing a variety of hole cutting applications.

2. Description of the Prior Art

Hole saws have been used for many years for the purpose of producing circular apertures in prescribed locations on both planar and curved surfaces. A typical hole saw consists of a cylindrical saw that forms a heavy base end with a threaded axially aligned hole in the bore. The hole saw is mounted to a coaxially positioned pilot drill by a mandrell fastened within a hole formed in the top of the hole saw.

The pilot drill extends past the cutting edge of the hole saw so that a pilot hole is cut into the material first before the hole saw begins to remove a circular plug of material from the work piece. The pilot drill thus keeps the hole saw properly positioned while the hole saw starts its cut. This need for positioning by the pilot drill is necessary when the hole saw is used with hand-held drills. Otherwise, during the cutting of a hard material, the hole saw has a tendency to walk around the work piece during the sawing of the hole.

To rectify the problems of imperfectly cut holes, some have proposed improved versions of hole saw assemblies. For example, U.S. Pat. No. 4,579,486 to Damico discloses a hole saw guide that positions a hole saw while forming a new hole either partially overlapping or surrounding an existing hole in a workpiece. U.S. Pat. No. 5,743,682 to Chaney Sr. discloses a hole tool guide assembly for use with a hole saw that includes a conically shaped core member with a longitudinal aperture and an offset parallel aperture to receive a pilot of a hole saw.

While the prior art is suitable for general use, the prior art is often cumbersome and more time consuming when used for special hole cutting applications. One such application is cutting an aligned hole through several planes of material. The prior art generally requires that the holes be manually aligned for each plane of material.

Another such application is extending the diameter of a previously cut hole. Once a hole has been cut into the work piece, difficulties arise if the hole is improperly positioned or is too small. A new hole is difficult to drill in the work piece, since there is no longer any material for the pilot drill to cut into to guide the hole saw.

Also, the prior art reveals hole cutting devices which require the user to push the hole cutting device through the material. For certain applications, it would be beneficial for the hole cutting device to be pulled through the material.

The prior art also fail to reveal a hole cutting device which can quickly and simply cut holes at an angle.

Accordingly, there is a need for a hole cutting device that can simply and quickly align holes through multiple planes of material.

Accordingly, there is also a need for a hole cutting device that can simply and quickly extend the diameter of a previously cut hole.

Accordingly there is a further need for a hole cutting device which allows the user to cut a hole by either pushing the device through the material or pulling the device through the material.

Accordingly, there is also a further need for a hole cutting device that can simply and quickly cut holes on an angle.

The present invention is a multi-function drill bit assembly with slidably positionable hole saw. As will be described in greater detail hereinafter, the present invention solves the aforementioned and employs a number of novel features that render it highly advantageous over the prior art.

SUMMARY OF THE INVENTION

Accordingly it is an object of this invention to provide a drill bit assembly with an adjustable arbor that allows one to drill a hole without wandering across the work surface.

Another object of this invention is to provide a drill bit assembly with an adjustable arbor that allows one to simply and quickly drill through two or more planes of material.

Another object of this invention is to provide a drill bit assembly with an adjustable arbor that allows one to simply and quickly extend the diameter of previously cut holes.

Yet another object of this invention is to provide a drill bit assembly with an adjustable arbor that allows the user to selectively pull or push the hole saw through the material being cut.

A further object of the present invention is to provide a drill bit assembly with an adjustable arbor that allows the users to simply and quickly drill a hole at an angle.

To achieve these objectives, and in accordance with the purposes of the present invention a multi-function drill bit assembly with slidably positionable hole saw is presented. The drill bit assembly is comprised of an elongate drill bit member, a reversible arbor member, and a hole saw member.

The elongate drill bit member has a drilling portion and an attachment portion. The drilling portion has a sharp cutting tip for boring through material. The attachment portion has at least one flat surface running longitudinally across.

The reversible arbor member has a first portion and a cylindrical skirt portion. A cylindrical cavity extends axially through the reversible arbor member. The elongate drill bit member is slidably and reversibly disposed in the cylindrical cavity. The cylindrical skirt portion extends outwardly from the first portion and is essentially concentric to the cylindrical cavity. The cylindrical skirt portion has an exterior surface with a first set of threads running circumferentially across.

The first portion of the reversible arbor member has a plurality of threaded channels extending therethrough to the cylindrical cavity. A plurality of correspondingly threaded set screws are disposed in the threaded channels extending through the threaded channels to the cylindrical cavity. The set screws contact the flat surface on the attachment portion of the arbor member pressing the elongate drill bit member against the walls of the cylindrical cavity and securing the elongate drill bit member to the reversible arbor member.

The hole saw member has a cylindrical body with a closed end and an open end. A plurality of cutting teeth peripherally extend from the open end. The closed end has an aperture therethrough, with a second set of threads extending circumferentially around the aperture. The second set of threads are axially aligned to correspond with the first set of threads on the cylindrical skirt portion of the reversible arbor member. The cylindrical skirt portion of the arbor member is disposed in the aperture in the closed end of the hole saw member, and the elongate drill member is disposed in and extends through the hole saw member.

When connected to a hand held drill, the multi-function drill bit assembly slidably positionable hole saw enables the user to perform a variety of different hole cutting tasks quickly and easily. The present invention is particularly suited for cutting aligned holes in multiple planes of material. The present invention can also be utilized to enlarge a previously cut hole. The user is able to cut a hole by pushing the present invention into the work piece and the present invention also allows the user to drill a hole on the opposite side of the work piece by reversing the arbor assembly and pulling the multi-function drill bit assembly into the work piece being sawed.

The present invention can be utilized in conjunction with an alignment tool that can measure the angle of the hole cut. The alignment tool has a flat platform that rests against the work piece. The flat platform pivotally mounts a tube with the aid of a pair of attachment means. The tube is angularly positioned in a parallel plane to an angle gauge, the angle gauge providing a means for the user to determine at what angle the tube is set with respect to the surface of the work piece. Once the tube is positioned at an appropriate angle, the elongate drill member is inserted into the tube, and a pilot hole is drilled.

Other objects, features, and advantages of the invention will become more readily apparent upon reference to the following description when taken in conjunction with the accompanying drawings.

BRIEF DESCRIPTION OF THE DRAWINGS

FIG. 1 is a side perspective view of an electric drill with the present invention attached thereto.

FIG. 2 provides an overhead planar view of the hole saw member along the line 2—2 in FIG. 1.

FIG. 3 is a side perspective of the present invention in a reverse position.

FIG. 5 is a side view of the present invention configured for hole enlarging use.

FIG. 6 is a side view of the present invention being used in conjunction with an alignment tool.

DESCRIPTION OF THE PREFERRED EMBODIMENT

Figure 4:
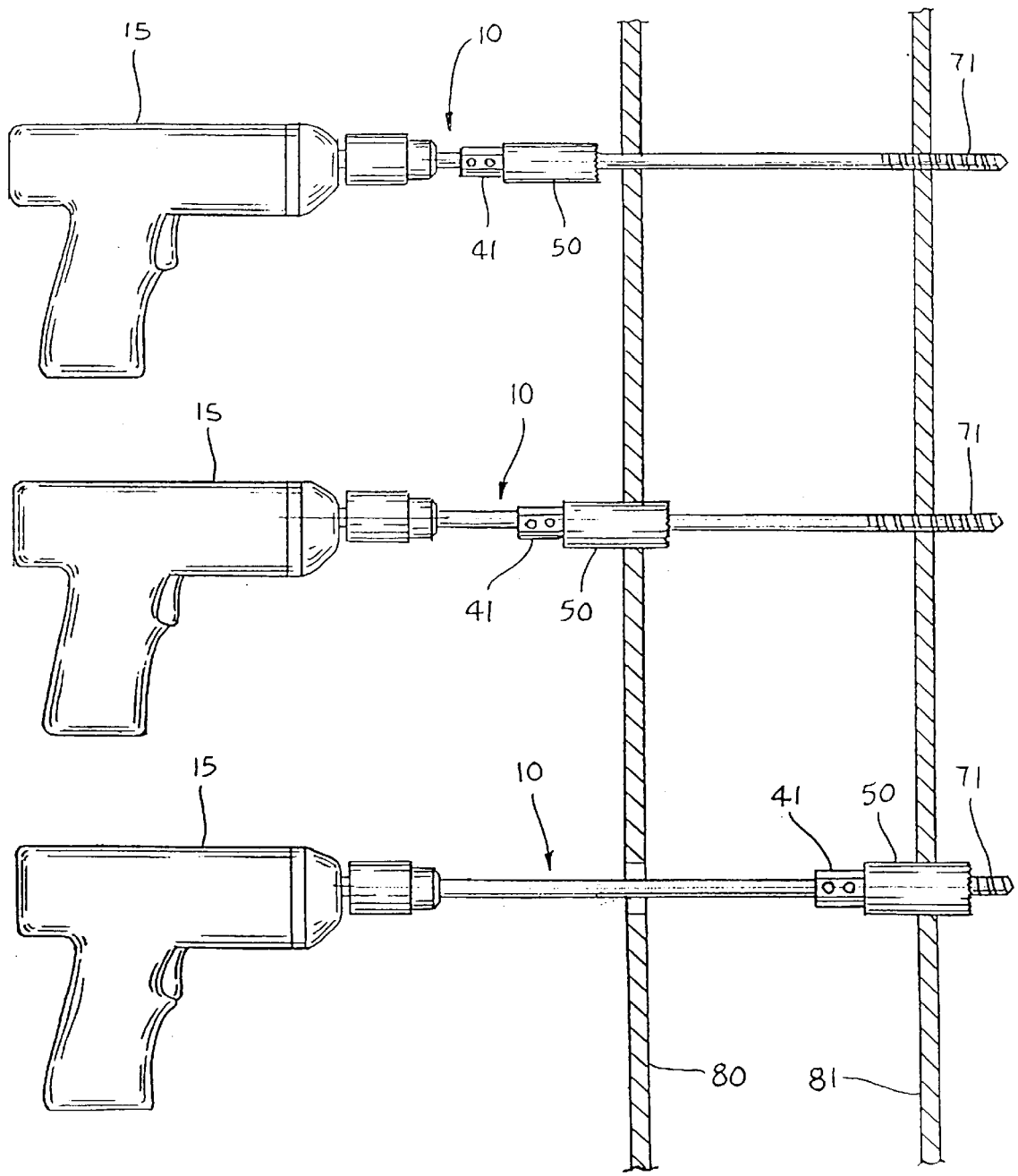
FIG. 4 is a progressive series of views showing the present invention creating aligned holes in two planes of material.

The present invention is a multi-function drill bit assembly with a slidably positionable hole saw 10. In the following description, numerous specific details are set forth in order to provide a thorough understanding of the present invention.

Referring to FIGS. 1 and 3, the elongate drill bit member 73 has a drilling portion 71 and an attachment portion 30. In the preferred embodiment, the elongate drill bit member 30 is at least 12 inches long. The drilling portion of the elongate drill bit member 71 has a sharp cutting tip 31 for boring through material. The scope of the present invention is not dependent on the exact design of the cutting tip, and accordingly, the cutting tip may be an auger bit, double twist auger bit or the like.

The attachment portion of the elongate drill bit member 30 has at least one flat surface running longitudinally across. The scope of the present invention is not dependent on the exact number of flat surfaces on the attachment portion, and it is possible to construct the hole saw mount portion as a hexagon, a pentagon, an octagon, etc. In the preferred embodiment, the attachment portion 30 of the elongate drill bit member 73 is shaped as a polygon, having a plurality of flat surfaces.

The reversible arbor member 41 has a first portion 46 and a cylindrical skirt portion 47. A cylindrical cavity 44 extends axially through the reversible arbor member 41, with the attachment portion 30 of the elongate drill bit member 73 being slidably and reversibly disposed in the cylindrical cavity 44. In the preferred embodiment, the cylindrical cavity 44 should be of sufficient diameter to house an elongate drill bit member 73 with a ⅜ inch diameter. However, the diameter of the cylindrical cavity 44 can vary in order to accommodate elongate drill members of differing diameters. In the preferred embodiment, the first portion 46 is shaped like a hexagon, but the shape of the first portion may vary without affecting the function of the present invention.

In the preferred embodiment, the reversible arbor member 41 has at least two threaded channels 43 extending through the first portion 46 with two correspondingly threaded set screws 45, disposed therein and extending through the threaded channels 43. The set screws 45 contact the flat surface on the attachment portion 30 of the arbor member 41 pressing the elongate drill bit member 73 against the walls of the cylindrical cavity 44 and securing the elongate drill bit member 73 to the reversible arbor member 41. It is preferable to use two set screws for tightening the reversible arbor member 41 onto the elongate drill bit member 73, but, nonetheless, it is possible to sufficiently tighten the reversible arbor member 41 onto the elongate drill bit member 73 with only one set screw.

In the preferred embodiment, the cylindrical skirt portion 47 extends outwardly from the first portion and is essentially concentric to the cylindrical cavity 44. The cylindrical skirt portion 47 has an exterior surface with a first set of threads 42 running circumferentially across. The diameter of the cylindrical skirt portion 47 is typically ⅝ or ⅞ of an inch to allow the cylindrical skirt portion 47 to receive standard hole saws.

Referring to FIGS. 1, 2, and 3, the hole saw member 50 has a cylindrical body with a closed end 53 and an open end 54. A plurality of cutting teeth 51 peripherally extends from the open end 54, with the teeth being capable of sawing off a portion of the work piece. The closed end has an aperture 57 therethrough. The hole saw member 50 can come in a diverse range of sizes. The various hole saw members allow the user to selectively drill a hole of differing depths and diameters.

In the preferred embodiment, a second set of threads 58 extend circumferentially around the aperture 57 in the closed end 53 of the hole saw member 50. The second set of threads 58 are axially aligned to correspond with the first set of threads 42 on the cylindrical skirt portion 47 of the reversible arbor member 41, allowing the hole saw member 50 to be detachably and rotatably connected to the cylindrical skirt portion 47 of the arbor member 41. The elongate drill bit member is disposed in and extends concentrically through the hole saw member 50. In another embodiment, the arbor member and the hole saw member are integrally attached in mounted assembly.

Referring to FIG. 4, when connected to a hand held reversible drill 15, the multi-function drill bit assembly with a slidably positionable hole saw enables the user to perform a variety of different hole cutting tasks. The present invention is particularly suited for cutting aligned holes in multiple planes of material. The attachment portion of the elongate drill member is disposed in and secured to the hand held drill 15 and the reversible arbor member 41 and hole saw member 50 are positioned a sufficient distance from the drilling portion 71 of the elongate drill member 73 to allow the drilling portion 71 to drill a pilot hole on both planes of material. The hole saw member first drills a pilot hole through both planes of material. Then the hole saw member is pushed through the first plane of material 80 cutting a hole therethrough. Then the reversible arbor 41 is adjusted so that the hole saw member 50 is in contact with the second plane of material 81, and the hole saw member 50 is then pushed through the second plane of material 81 creating an aligned hole through both planes.

Referring to FIG. 5, the user may also use the present invention to increase the diameter of a previously cut hole. A reversible arbor member 41 with a hole saw member 50 having the corresponding diameter of the hole to be enlarged is first attached to the attachment portion 30 of the elongated drill member 73. A second reversible arbor member 90 with a second hole saw member 91, the second hole saw member having a greater diameter than the hole saw member 50, is then mounted atop the reversible arbor member 41 and the hole saw member 50. The hole saw member 50 is then inserted into the hole and the drill 15 is activated. The hole saw member 50 acts as a guide for the second hole saw member 91 as the second hole saw member 91 is being pushed through the material.

Referring to FIGS. 1 and 3, the present invention may be used for cutting a hole on both surfaces of a two-sided work piece. When a hole is to be cut on the surface facing the electric drill, the reversible arbor member 41 and the hole saw member 50 are mounted so that the cutting teeth 51 face away from the hand held drill 15. The user is able to drill a hole by pushing the hand held drill 15 into the work piece being sawed.

On the other hand, the present invention also allows the user to drill a hole on the opposite side of the work piece. The user initially drills a hole through the work piece using the cutting tip 31 of the elongate drill bit member 73. Once the pilot bit protrudes out of the opposite side of the work piece, the hole saw is mounted onto the elongate drill bit member 73 such that the teeth face towards the hand held drill 15. The user saws a hole by pulling the hand held drill 15 towards himself.

Referring to FIG. 6, The present invention can be utilized in conjunction with an alignment tool 100 that can measure the angle of the hole cut. The alignment tool has a flat platform 101 that rests against the work piece. The flat platform 101 pivotally mounts a tube 102 with the aid of a pair of attachment means 103. The tube 101 is angularly positioned in a parallel plane to an angle gauge 104, the angle gauge providing a means for the user to determine at what angle the tube is set with respect to the surface of the work piece. Once the tube 102 is positioned at an appropriate angle, the elongate drill member is inserted into the tube, and an angled pilot hole is drilled. Once an angled pilot hole is drilled, the alignment tool 100 is removed, and the hole saw member is positioned on top of the material to be cut. According to another embodiment, the tube is sized to allow the hole saw member to pass through the tube negating the need to remove the alignment tool.

It is generally difficult to cut larger holes at an angle because the larger hole saw tends to wander. The present invention alleviates this problem through the use of multiple arbor members and hole saw members. A plurality of hole saw members and arbor members are attached onto the elongated drill bit member, with the hole saw members being mounted atop each other and being arranged progressively with the smallest hole saw member being closest to the material being drilled and the largest hole saw member being closest to the hand held drill 15. In this arrangement, the smaller hole saw member acts to guide the larger hole saw member through the material and provides a more stable anchor to the material being cut thereby minimizing any wandering movement by the larger hole saw member.

The invention described above is the preferred embodiment of the present invention. It is not intended that the novel device be limited thereby. The preferred embodiment may be susceptible to modifications and variations that are within the scope and fair meaning of the accompanying claims and drawings

I claim:

1. A multi-function drill bit assembly with slidably positionable hole saw, the drill bit assembly comprising:

an elongate drill bit member, the elongate drill bit member having a drilling portion and an attachment portion, the drilling portion having a sharp cutting tip, the attachment portion having at least one flat surface running longitudinally across;

a reversible arbor member, a cylindrical cavity extends axially through the reversible arbor member, the attachment portion of the elongate drill bit member being slidably and reversibly disposed in the cylindrical cavity, the reversible arbor member having a first portion and a cylindrical skirt portion, the cylindrical skirt portion extending outwardly from the first portion and being generally concentric with the cylindrical cavity, the cylindrical skirt portion having an exterior surface with a first set of threads running circumferentially across, the reversible arbor member being mountable on said elongate drill bit member with the cylindrical skirt portion to extend either in a same direction as said sharp cutting tip or alternatively in an opposite direction 180° remote from said sharp cutting tip;

means for securing the arbor member to the elongate drill bit member in corotative assembly; and a hole saw member, the hole saw member having a cylindrical body with a closed end and an open end, a plurality of cutting teeth peripherally extending from the open end, the closed end having an aperture therethrough, a second set of threads extends circumferentially around the aperture, the second set of threads being axially aligned to correspond with the first set of threads, the cylindrical skirt portion of the arbor member being disposed in the aperture in the hole saw member, and the elongate drill bit member being disposed in and extending through the hole saw member.

2. The drill bit assembly in claim 1 wherein the reversible arbor member has a plurality of threaded channels extending therethrough to the cylindrical cavity with a plurality of correspondingly threaded set screws being disposed therein, the set screws extending through the threaded channels and contacting the flat surface on the attachment portion of the elongate drill bit member, providing a means for securing the reversible arbor member to the elongate drill bit member.

3. The drill bit assembly in claim 1 wherein the elongate drill bit member is at least 12 inches long.

4. The drill bit assembly in claim 1 wherein the attachment portion of the elongate drill bit member is in mounted assembly with a plurality of arbor members and hole saw members mounted thereon.

5. The drill bit assembly in claim 1 wherein the attachment portion of the elongate drill bit member is shaped as a polygon.

6. The drill bit assembly in claim 1 wherein the cylindrical skirt portion of the reversible arbor member has a diameter of 5/8 of an inch.

7. The drill bit assembly in claim 1 wherein the cylindrical skirt portion of the reversible arbor member has a diameter of 7/8 of an inch.

8. A multi-function drill bit assembly with slideably positionable hole saw, the drill bit assembly comprising:

an elongate drill bit member, the elongate drill bit member having a drilling portion and an attachment portion, the drilling portion having a sharp cutting tip, the attachment portion having at least one flat surface running longitudinally across;

a reversible arbor member, a cylindrical cavity extends axially through the reversible arbor member, the attachment portion of the drill bit member being slideably and reversibly disposed in the cylindrical cavity, the reversible arbor member having a first portion and a cylindrical skirt portion, the cylindrical skirt portion extending outwardly from the first portion and being essentially concentric to the cylindrical cavity, the reversible arbor member being mountable on said elongate drill bit member with the cylindrical skirt portion to extend either in a same direction as said sharp cutting tip or alternatively in an opposite direction 180° remote from said sharp cutting tip;

means for securing the arbor member to the elongate drill member in corotative assembly;

a hole saw member, the hole saw member having a cylindrical body with a closed end and an open end, the closed end having an aperture therethrough, a plurality of cutting teeth peripherally extending from the open end, the cylindrical skirt portion of the arbor member being disposed in the aperture in the hole saw member and the elongate drill bit member being disposed in and extending through the hole saw member; and means for securing the hole saw member to the arbor member in corotative assembly.

9. The drill bit assembly in claim 8 wherein the cylindrical skirt portion of the arbor member has an exterior surface with a first set of threads running circumferentially across, and the closed end portion of the hole saw member having a second set of threads extending circumferentially around the aperture, the second set of threads being axially aligned to correspond with the first set of threads, providing a means for rotatably attaching the hole saw member onto the reversible arbor member.

10. The drill bit assembly in claim 9 wherein the reversible arbor member has a plurality of threaded channels extending therethrough to the cylindrical cavity with a plurality of correspondingly threaded set screws being disposed therein, the set screws extending through the threaded channels and contacting the flat surface on the attachment portion of the elongate drill bit member, providing a means for securing the reversible arbor member to the elongate drill bit member.

11. The drill bit assembly in claim 10 wherein the elongate drill bit member is at least 12 inches long.

12. The drill bit assembly in claim 11 wherein the attachment portion of the elongate drill bit member is in mounted assembly with a plurality of arbor members and hole saw members mounted thereon.

13. The drill bit assembly in claim 12 wherein the attachment portion of the elongate drill bit member is shaped as a polygon.

14. In combination, a multi-function, multi-angular, hole cutting assembly, the hole cutting assembly comprising:

a drill member;

an elongate drill bit member, the elongate drill bit member having a drilling portion and an attachment portion, the drilling portion having a sharp cutting tip, the attachment portion having at least one flat surface running longitudinally across, the attachment portion being partially disposed in the drill member;

a reversible arbor member, a cylindrical cavity extends axially through the reversible arbor member, the attachment portion of the drill bit member being slideably and reversibly disposed in the cylindrical cavity, the arbor member having a first portion and a cylindrical skirt portion, the cylindrical skirt portion extending outwardly from the first portion and being essentially concentric to the cylindrical cavity, the reversible arbor member being mountable on said elongate drill bit member with the cylindrical skirt portion to extend either in a same direction as said sharp cutting tip or alternatively in an opposite direction 180° remote from said sharp cutting tip;

means for securing the arbor member to the elongate drill bit member;

a hole saw member, the hole saw member having a hollow cylindrical body with a closed end and an open end, the closed end having an aperture therethrough, a plurality of cutting teeth peripherally extending from the open end, the cylindrical skirt portion of the arbor member being disposed in the aperture in the hole saw member and the elongate drill bit member being disposed in and extending through the hole saw member;

means for securing the hole saw member to the arbor member; and an angle alignment tool member, the alignment tool member having a platform, a guide tube, and an angle gauge, the platform having a drilling aperture therethrough, the angle gauge being mounted onto the platform, the guide tube being pivotally mounted and positioned over the drilling aperture allowing the tube to be pivoted in a parallel plane to the angle gauge, the drilling portion of the drill bit member being disposed in the guide tube.

15. The hole cutting assembly in claim 14 wherein the cylindrical skirt portion of the arbor member has an exterior surface with a first set of threads running circumferentially across, the closed end portion having a second set of threads extending circumferentially around the aperture, the aperture and the second set of threads being sized and axially aligned to correspond with the cylindrical skirt portion and the first set of threads providing a means for rotatably attaching the hole saw member onto the arbor member.

16. The hole cutting assembly in claim 14 wherein the reversible arbor member has a plurality of threaded channels extending therethrough to the cylindrical cavity with a plurality of correspondingly threaded set screws being disposed therein, the set screws extending through the threaded channels and contacting the flat surface on the attachment portion of the elongate drill bit member providing a means for securing the reversible arbor member to the elongate drill bit member.

17. The hole cutting assembly in claim 14 wherein the elongate drill bit member is at least 12 inches long.

18. The drill bit assembly in claim 14 wherein the attachment portion of the elongate drill bit member is in mounted assembly with a plurality of arbor members and hole saw members mounted thereon.

19. The hole cutting assembly in claim 14 wherein the attachment portion of the elongate drill bit member is shaped as a polygon.

20. The hole cutting assembly in claim 14 wherein the drill member is a hand held reversible drill.

21. A multi-function drill bit assembly including a slideably positionable hole saw, the drill bit assembly comprising:
   an elongate drill bit member, the elongate drill bit member having a drilling portion and an attachment portion, the drilling portion having a sharp cutting tip;
   an arbor member, a cylindrical cavity extends axially through the arbor member, the elongate drill bit member being slideably and reversibly disposed in the cylindrical cavity,
   a hole saw member, the hole saw member extending from an end of the arbor member and being generally concentric to the cylindrical cavity, the hole saw member having saw teeth at an end most remote from said arbor member, the hole saw member being mountable on said elongate drill bit member with saw teeth positioned to extend either in a same direction as said sharp cutting tip or alternatively in an opposite direction 180° remote from said sharp cutting tip thus enabling the hole saw member perform a push cut on the top side or a pull cut on the underside of a member to be provided with a cut hole;
   means for securing said hole saw member and said arbor member in corotative assembly together; and
   means for securing the arbor member to the elongate drill bit member.

22. The drill bit assembly in claim 21 wherein the attachment portion of the elongate drill bit member is in mounted assembly with a plurality of arbor members and hole saw members mounted thereon.

23. The drill bit assembly in claim 21 wherein the hole saw member and the arbor member are secured in fixed assembly together, and are rotateable in unison together to be mounted on the drill bit to enable the hole saw member to cut holes in a member from the top side or an underside of said member.

24. The drill bit assembly in claim 21 wherein the arbor member has a plurality of threaded channels extending therethrough to the cylindrical cavity with a plurality of correspondingly threaded set screws being disposed therein, the set screws extending through the threaded channels and contacting the elongate drill bit member, providing a means for securing the arbor member to the elongate drill bit member.

25. The drill bit assembly in claim 21 wherein a cylindrical skirt extends outwardly from the arbor member and essentially concentrically to the cylindrical cavity, the cylindrical skirt portion of the arbor member has an exterior surface with a first set of threads running circumferentially across, the hole saw member having a closed end portion at an end opposite the saw teeth, the closed end having an aperture and a second set of threads extending circumferentially around the aperture, the aperture and the second set of threads being sized and axially aligned to correspond with the cylindrical skirt portion and the first set of threads providing a means for rotateably attaching the hole saw member onto the arbor member.

26. A multi-function drill bit assembly including a slideably positionable hole saw, the drill bit assembly comprising:
   an elongate drill bit member, the elongated drill bit member having a drilling portion and an attachment portion, the drilling portion having a sharp cutting tip;
   a circular hole saw member having a diameter greater than the drill bit member and being generally concentric to the elongated drill bit member, the hole saw member having circular saw teeth at one end, the hole saw member being mountable on said elongate drill bit member with saw teeth positioned to extend in a same direction as said sharp cutting tip or alternatively in an opposite direction 180° remote from said sharp cutting tip thus enabling the hole saw member to perform selectively a push cut on the top side of a member to be provided with a cut hole or a pull cut on the underside of a member to be provided with a cut hole; and
   means for concentrically securing said hole saw member to said elongated drill bit member; said circular hole saw member being mountable in co-rotateable assembly to the selectively elongated drill member to accomplish cutting of a member by a push cut.

\* \* \* \* \*